(12) United States Patent
Qiu et al.

(10) Patent No.: US 11,532,908 B1
(45) Date of Patent: Dec. 20, 2022

(54) POWER RECEPTACLE WITH PROTECTIVE COVER

(71) Applicant: Chengli Li, Suzhou (CN)

(72) Inventors: Shi Qiu, Suzhou (CN); Lei Qian, Suzhou (CN)

(73) Assignee: Chengli Li, Suzhou (CN)

( * ) Notice: Subject to any disclaimer, the term of this patent is extended or adjusted under 35 U.S.C. 154(b) by 0 days.

(21) Appl. No.: 17/391,327

(22) Filed: Aug. 2, 2021

(30) Foreign Application Priority Data

Jul. 22, 2021 (CN) .......................... 202110829566.5
Jul. 22, 2021 (CN) .......................... 202121672849.5

(51) Int. Cl.
*H01R 13/447* (2006.01)
*H01R 13/52* (2006.01)
*H02G 3/14* (2006.01)
*H01R 27/02* (2006.01)

(52) U.S. Cl.
CPC ....... *H01R 13/5213* (2013.01); *H01R 13/447* (2013.01); *H01R 27/02* (2013.01); *H02G 3/14* (2013.01)

(58) Field of Classification Search
CPC .. H01R 13/5213; H01R 13/447; H01R 27/02; H01R 25/006; H01R 25/003; H01R 13/73; H02G 3/14
See application file for complete search history.

(56) References Cited

U.S. PATENT DOCUMENTS

| 10,720,764 | B2 * | 7/2020 | Misener | ................. H02G 3/18 |
| 10,770,843 | B1 * | 9/2020 | Zhang | ..................... G06F 1/26 |
| 2017/0356638 | A1 * | 12/2017 | Mousavi | ............... F21S 8/035 |

* cited by examiner

*Primary Examiner* — Tho D Ta
(74) *Attorney, Agent, or Firm* — Chen Yoshimura LLP

(57) ABSTRACT

The present invention provides a power receptacle with protective functions, which includes a base assembly, a grounding assembly coupled to the base assembly, a first faceplate coupled to a top of the base assembly, and a cover assembly. The first faceplate includes at least one USB (Universal Serial Bus) interface slot electrically coupled to the base assembly. The cover assembly is removably coupled to the first faceplate and configured to cover the USB interface slot. The power receptacle can prevent dust and other objects from entering the slots, thereby ensuring the safety of the receptacle and prolong its life.

8 Claims, 7 Drawing Sheets

POWER RECEPTACLE WITH PROTECTIVE COVER

BACKGROUND OF THE INVENTION

Field of the Invention

This invention relates to electrical devices, and in particular, it relates to a power receptacle with protective covers.

Description of Related Art

With the wide use of home appliances, safety of the appliances is important. Many conventional power receptacles do not have safety protections for the outlet slots. Thus, when no cable is plugged into the slots, dust and other objects can enter the slots, which affects the life of the receptacles and can cause short circuit which can damage the devices plugged into it.

There is a need for power receptacles with protective features that are easy to install and easy to manufacture.

SUMMARY

To solve some of the above problems, the present invention provides a power receptacle with protective functions, which includes: a base assembly; a grounding assembly coupled to the base assembly; a first faceplate coupled to a top of the base assembly, including at least one USB (Universal Serial Bus) interface slot electrically coupled to the base assembly, and a cover assembly, removably coupled to the first faceplate and configured to cover the USB interface slot.

In some embodiments, the power receptacle further includes a second faceplate removably coupled to the top of the first faceplate, wherein the cover assembly is removably coupled to the second faceplate and configured to cover the USB interface slot.

In some embodiments, the at least one USB interface slot includes one or more of at least one USB Type-A interface slot and at least one USB Type-C interface slot.

In some embodiments, the cover assembly includes: a cover plate, configured to cover the at least one USB interface slot; one or more rotation shafts, disposed on a first side of the cover plate, and configured to pivotally couple the cover plate to the first faceplate or the second faceplate; and a snap, disposed on a second side of the cover plate different from the first side, and configured to retain the cover plate to the first faceplate or the second faceplate by cooperating with the first faceplate or the second faceplate.

In some embodiments, the first faceplate includes: a first trough, including a first opening that corresponds to the USB interface slot; and a first locking member located on one side of the first trough; wherein a shape of the first trough matches and complements a shape of the cover plate, wherein another side of the first trough is configured to receive the rotation shafts, and wherein when the cover plate covers the at least one USB interface slot, the snap and the first locking member cooperate with each other to lock the cover plate to the first faceplate.

In some embodiments, the second faceplate includes: a second trough, including a second opening that corresponds to the USB Type-A interface slot and/or a third opening that corresponds to the USB Type-C interface slot; and a second locking member located on one side of the second trough; wherein a shape of the second trough matches and complements a shape of the cover plate, wherein another side of the second trough is configured to receive the rotation shafts, and wherein when the cover plate covers the at least one USB interface slot, the snap and the second locking member cooperate with each other to lock the cover plate to the second faceplate.

In some embodiments, the cover assembly includes: a cover plate, configured to cover the at least one USB interface slot; two slide rails, respectively located on two sides of the cover plate; wherein the cover plate is slidably coupled to the first faceplate or the second faceplate via the slide rails.

In some embodiments, the first faceplate further includes: a first trough, including a first opening that corresponds to the at least one USB interface slot; and two first sliders located on two sides of the first trough; wherein a shape of the first trough matches and complements a shape of the cover plate, wherein when the cover plate covers the at least one USB interface slot, the first trough is coupled to the cover plate via cooperation of the two slide rails and two first sliders.

In some embodiments, the second faceplate further includes: a second trough, including a second opening that corresponds to the USB Type-C interface slot and/or a third opening that corresponds to the USB Type-C interface slot; and two second sliders located on two sides of the second trough; wherein a shape of the second trough matches and complements a shape of the cover plate, wherein when the cover plate covers the at least one USB interface slot, the second trough is coupled to the cover plate via cooperation of the two slide rails and two second sliders.

In some embodiments, the power receptacle includes a plurality of cover assemblies, wherein each cover assembly is configured to removably cover one of the at least one USB Type-A interface slots and at least one USB Type-C interface slots.

In some embodiments, each cover assembly includes: a cover plate, configured to cover one of the at least one USB Type-A interface slots and the at least one USB Type-C interface slots; a sliding block, located on one side of the cover plate; wherein the cover plate is slidably coupled to the first faceplate or the second faceplate via the sliding block.

In some embodiments, the first faceplate further includes: a plurality of first troughs, each first trough including a first opening that corresponds to one of the USB interface slots; and a plurality of first slide rails, each first slide rail located on one side of a corresponding first trough; wherein a shape of the each of the plurality of first troughs matches and complements a shape of a corresponding one of the plurality of cover plates, and wherein when the cover plate covers the USB interface slot, the first trough is coupled to the cover plate via cooperation of the corresponding sliding block and the first slide rail.

In some embodiments, the second faceplate further includes: a plurality of second troughs, each first trough including one second opening that corresponds to one USB Type-A interface slot or one third opening that corresponds to one USB Type-C interface slot; and a plurality of second slide rails, each second slide rail located on one side of a corresponding second trough; wherein a shape of the each of the plurality of second troughs matches and complements a shape of a corresponding one of the plurality of cover plates, wherein when the cover plate covers the USB Type-A interface slot or the USB Type-C interface slot, the second trough is coupled to the cover plate via cooperation of the corresponding sliding block and the second slide rail.

The power receptacle with protective covers according to embodiments of the present invention provides protective covers for USB interface slots of the receptacle, so that when the USB interface slots are not being used, the protective covers prevent dust and other objects from entering the slots. This can prolong the life of the receptacle and ensure safety of the receptacle by preventing short circuit conditions.

BRIEF DESCRIPTION OF THE DRAWINGS

Preferred embodiments of the present invention are described with reference to the drawings. These drawings serve to explain the embodiments and their operating principle, and only illustrate structures that are necessary to the understanding of the principles of the invention. These drawings are not necessarily to scale. In the drawings, like features are designated by like reference symbols.

FIG. 2b is an enlarged view of a portion of the power receptacle of FIG. 2a.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Technical problems to be solved by embodiments of the present invention include: In some conventional power receptacles, when an interface slot is not being used, dust and other particulate objects may enter the slots, which shortens the life of the power receptacle and can cause short circuit.

To solve the above problems, embodiments of the present invention provides a power receptacle with one or more protective covers. The power receptacle includes a base assembly, a grounding assembly coupled to the base assembly, a first faceplate coupled to the top of the base assembly, and a cover assembly. The first faceplate includes at least one USB interface slot electrically coupled to the base assembly. The cover assembly is removably coupled to the first faceplate, and configured to cover the USB interface slot.

First Embodiment

Figure 1A:
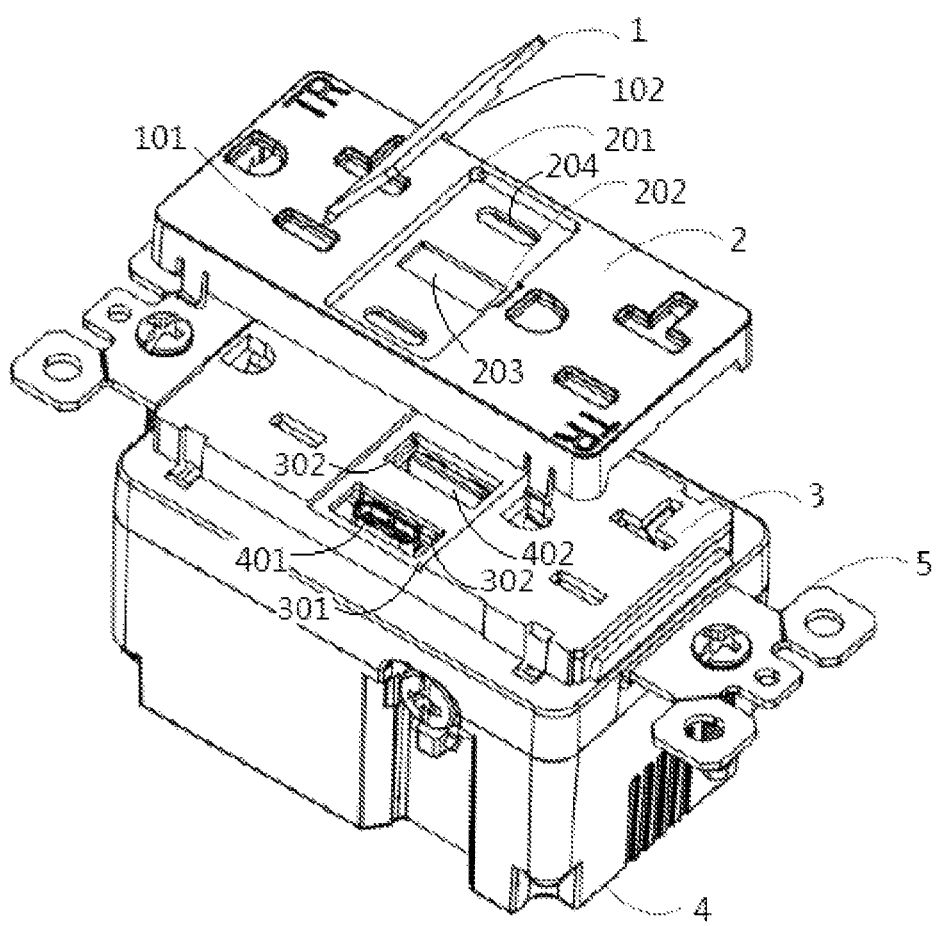
FIGS. 1a-1c illustrate the structure of a power receptacle with a protective cover according to a first embodiment of the present invention.
Figure 1B:
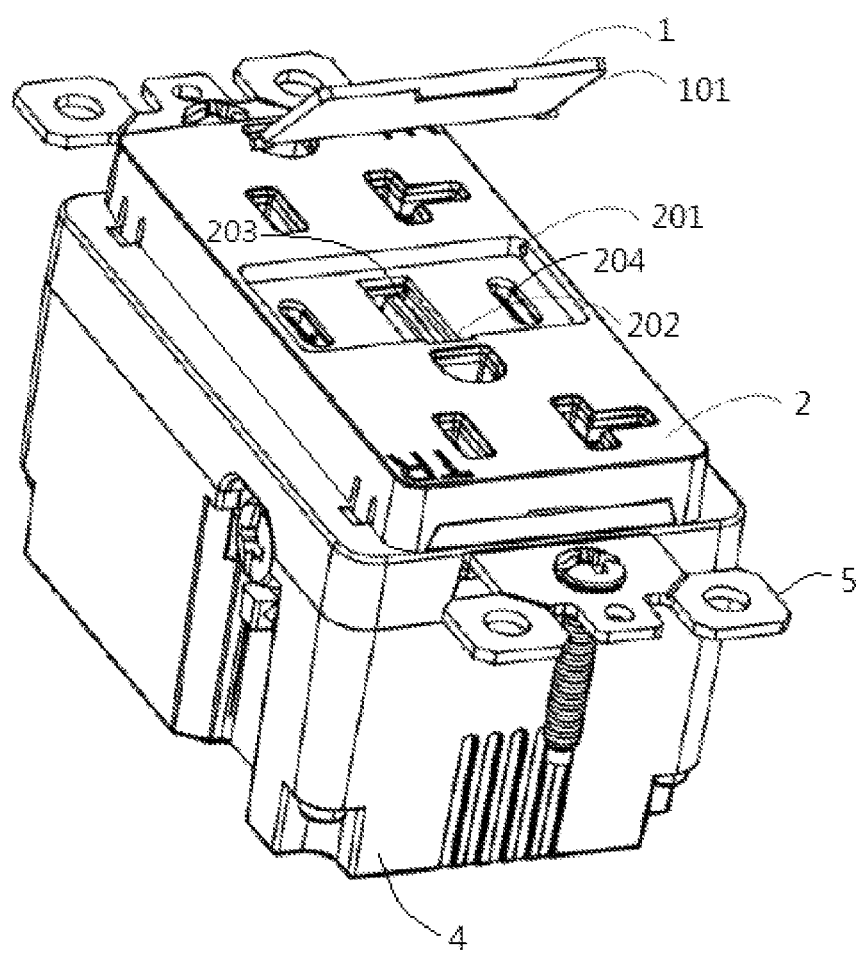
Figure 1C:
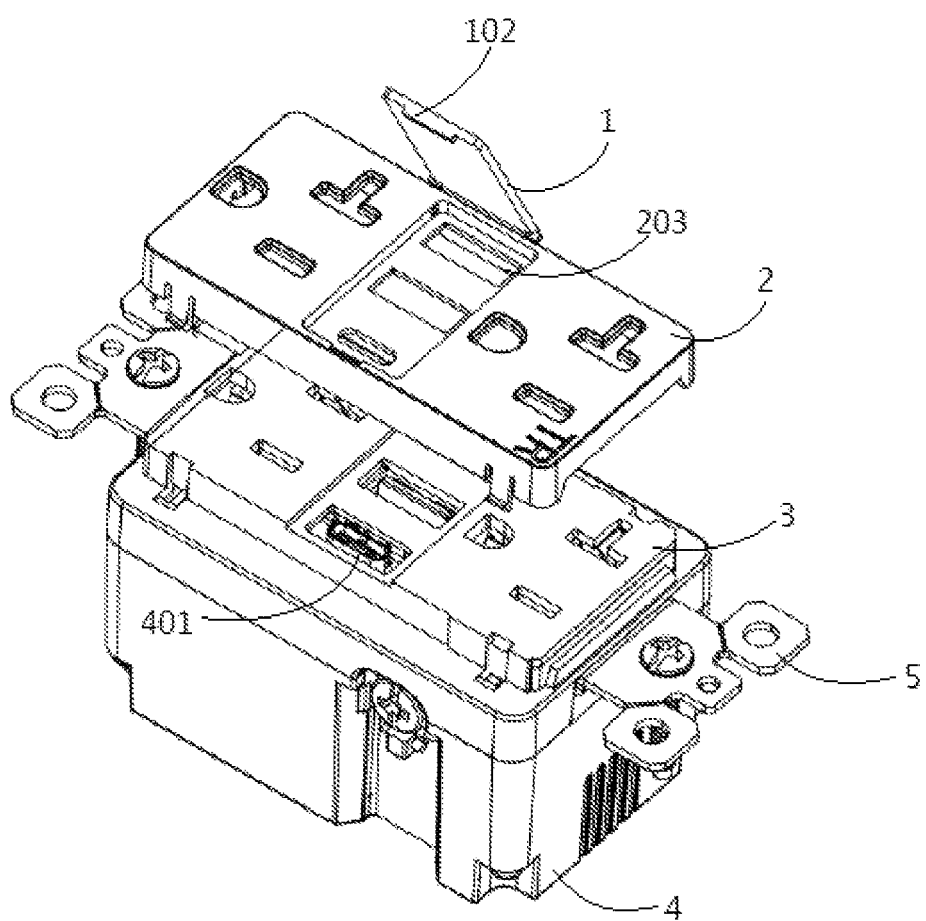

As shown in FIGS. 1a-1c, the power receptacle according to a first embodiment of the present invention includes a base assembly 4, a grounding assembly 5 coupled to the base assembly 4, a first faceplate 3 and a second faceplate 2. In this embodiment, the first faceplate 3 is coupled to the top of the base assembly 4, and includes at least one USB Type-A interface slot 401 and at least one USB Type-C interface slot 402 electrically coupled to the second faceplate 4. The second faceplate 2 is coupled to the top of the first faceplate 3, and includes a cover assembly. The cover assembly is configured to removably cover the USB Type-A interface slot 401 and the USB Type-C interface slot 402.

In this embodiment, the cover assembly is removably disposed on the second faceplate 2 or the first faceplate 3.

As shown in FIGS. 1a-1c, the cover assembly includes a cover plate 1, one or more rotation shafts 101, and a snap 102. The cover plate 1 is configured to cover the USB Type-A interface slot 401 and USB Type-C interface slot 402. The rotation shafts 101 are disposed on a first side of the cover plate 1, and pivotally couple the cover plate 1 to the second faceplate 2. The snap 102 is disposed on a second side of the cover plate 1 different from the first side and configured to retain the cover plate 1 to the second faceplate 2 by cooperating with the second faceplate 2.

In this embodiment, the first faceplate 3 includes a first trough 301 and a locking member (not shown in the drawings) located on one side of the first trough. One or more first openings 302 that correspond to the USB Type-A interface slot 401 or USB Type-C interface slot 402 are provided within the first trough 301. In the illustrated embodiment, three first openings 302 having the same sizes and shapes are provided. The structure of the first faceplate 3 can reduce the manufacturing requirements for the of the first openings and can accommodate different types of USB interface slots.

In this embodiment, the second faceplate 2 includes a second trough 201 and a locking member 202 located on one side of the second trough 201. One or more second openings 203 that correspond to the USB Type-A interface slot 401 and/or one or more third openings 204 that correspond to the USB Type-C interface slot 402 are provided within the second trough 201.

In this embodiment, the shape of the second trough 201 matches and complements the shape of the cover plate 1, and the other side of the second trough 201 is configured to receive the rotation shafts 101, so that when the cover plate 1 covers the USB Type-A interface slot 401 and USB Type-C interface slot 402, the snap 102 and locking member 202 cooperate with each other to lock the cover plate 1 to the second faceplate 2.

In use, when the USB Type-A interface slot 401 and/or USB Type-C interface slot 402 need to be used, the cover plate 1 can be pivoted around the rotation shafts 101 to open and expose the USB interface slots. After use, the cover plate 1 can be pivoted around the rotation shafts 101 into the second trough 201, and locked by the cooperation of the snap 102 and locking member 202, so that the cover plate 1 is retained in the second faceplate 2. This can prevent dust, metal particles, and other objects from entering the USB interface slots.

In some embodiment, when the second faceplate 2 is not provided, the shape of the first trough 301 matches and complements the shape of the cover plate 1, and one side of the first trough 301 is configured to received the rotation shafts 101, so that when the cover plate 1 covers the USB Type-A interface slot 401 and USB Type-C interface slot 402, the snap 102 and locking member on the first trough 301 cooperate with each other to lock the cover plate 1.

The power receptacle shown in FIG. 1c is similar to that shown in FIGS. 1a-1b except for the locations and orientations of the rotation shafts 101 and snap 102. In FIGS. 1a-1b, the rotation shafts 101 are parallel to the short side of the second faceplate 2, while in FIG. 1c, the rotation shafts 101 are parallel to the long side of the second faceplate 2.

The power receptacle may be used flexibly with or without the second faceplate.

Second Embodiment

Figure 2A:
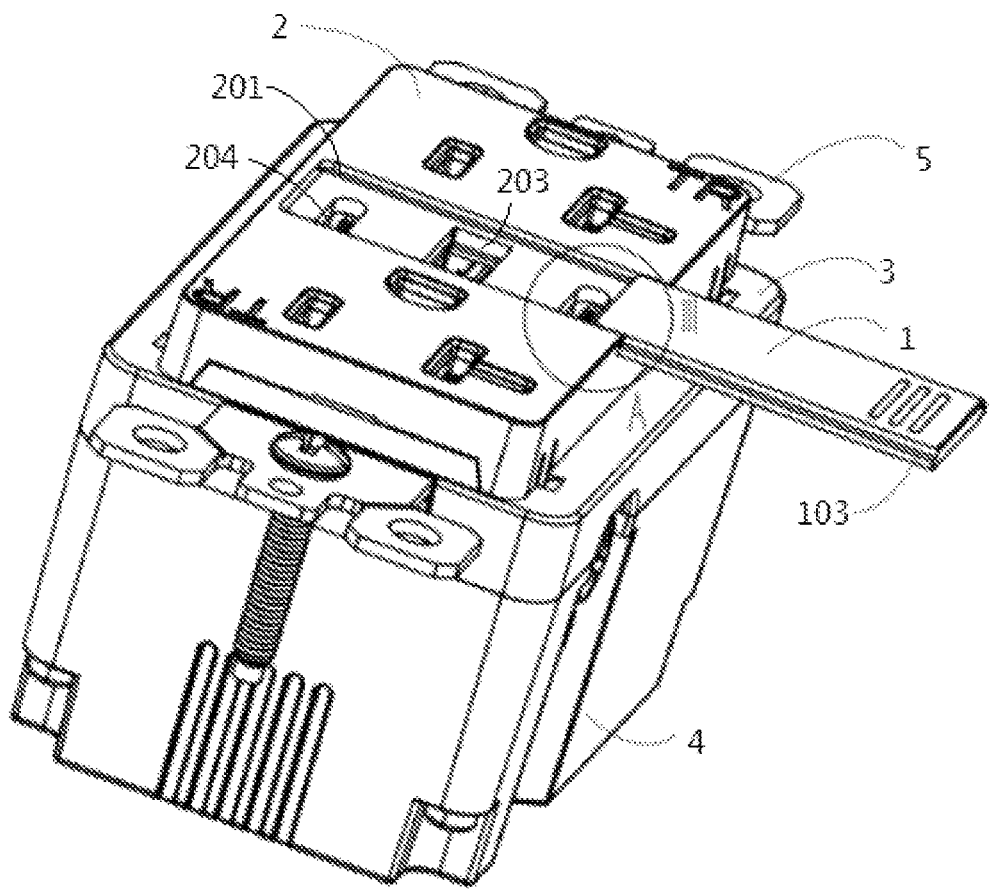
FIG. 2a illustrates the structure of a power receptacle with a protective cover according to a second embodiment of the present invention.
Figure 2B:
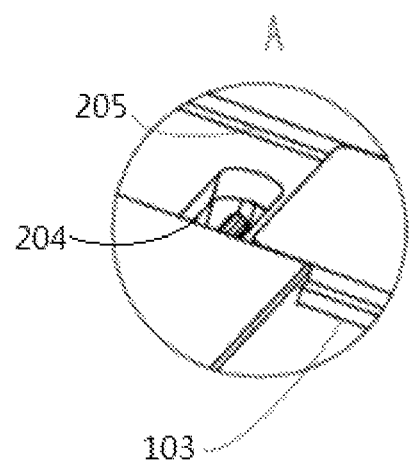
Figure 2C:
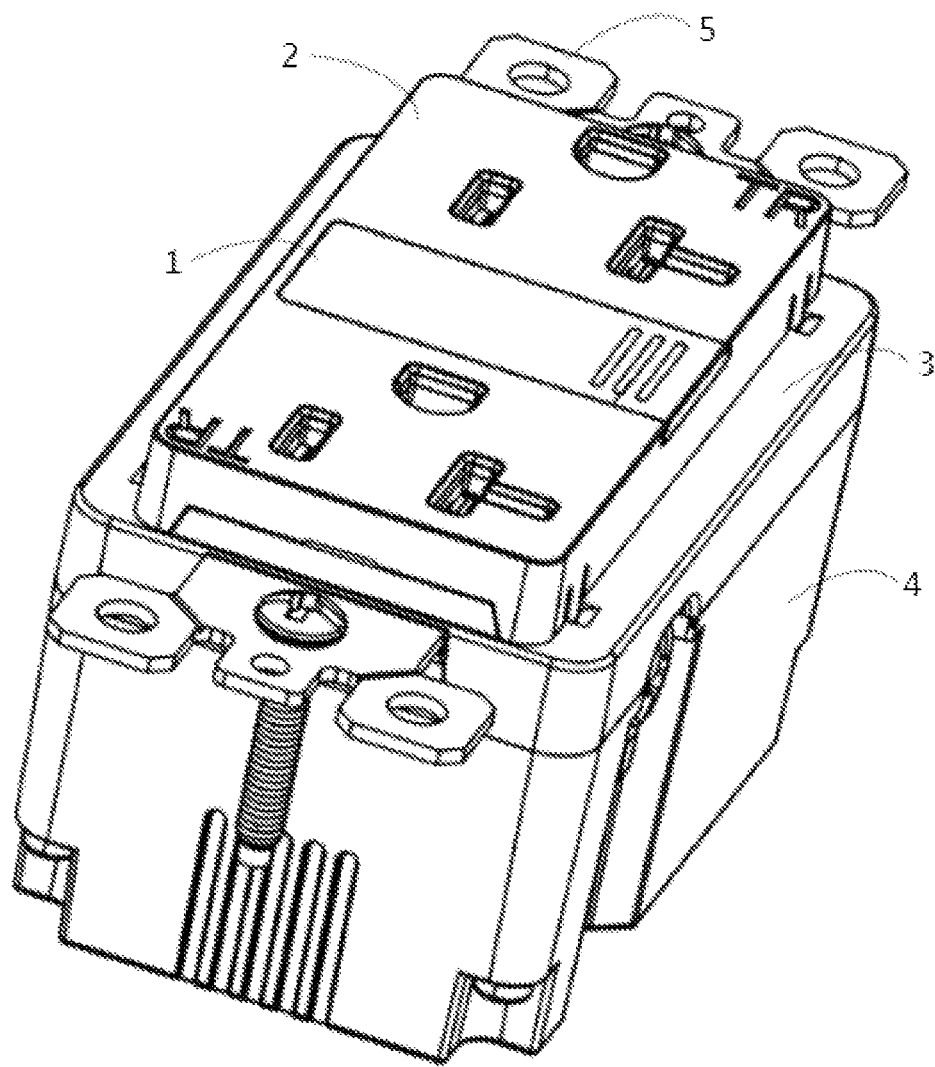
FIG. 2c is another illustration of the power receptacle according to the second embodiment.

As shown in FIGS. 2a-2c, the power receptacle according to a second embodiment of the present invention includes a base assembly 4, a grounding assembly 5 coupled to the base assembly 4, a first faceplate 3 and a second faceplate 2 with a cover assembly. In this embodiment, the base assembly 4, grounding assembly 5, first faceplate 3, and second faceplate 2 are similar to the corresponding components of the first embodiment, and their detailed descriptions are omitted.

As shown in FIGS. 2a-2c, the cover assembly includes a cover plate 1 with two slide rails 103. The cover plate 1 is configured to cover the USB Type-A interface slot 401 and USB Type-C interface slot 402. The two slide rails 103 are respectively located on two sides of the cover plate 1, so that the cover plate 1 is slidably coupled to the second faceplate 2 via the slide rails 103.

In this embodiment, the first faceplate 3 includes a first trough (not shown in the drawings) and two first sliders (not shown in the drawings) located on two sides of the first trough. One or more first openings (not shown in the drawings) that correspond to the USB interface slots 401 or 402 are provided within the first trough. The shape of the first trough matches and complements the shape of the cover plate 1, so that when the cover plate 1 covers the USB interface slots, the first trough is coupled to the cover plate 1 via the cooperation of the two slide rails and the two sliders.

Although the first trough, the two first sliders and the first opening are not shown in the drawings, their structures are respectively similar to the second trough, the two second sliders and the second or third opening of the second faceplate 2 described below. When the second faceplate 2 is not provided, the cover plate 1 is directly coupled to the first trough of the first faceplate 3, to provide dust prevention functions for the receptacle similar to the way the cover plate 1 is coupled to the second trough as described below.

In this embodiment, the second faceplate 2 includes a second trough 201 and two second sliders 205 located on two sides of the second trough 201. One or more second openings 203 that correspond to the USB Type-A interface slot 401 and/or one or more third openings 204 that correspond to the USB Type-C interface slot 402 are provided within the second trough 201.

In this embodiment, the shape of the second trough 201 matches and complements the shape of the cover plate 1, so that when the cover plate 1 covers the USB Type-A interface slot 401 and USB Type-C interface slot 402, the second trough 201 is coupled to the cover plate 1 via the cooperation of the two slide rails 103 and two second sliders 205.

In use, when the USB Type-A interface slot 401 and/or USB Type-C interface slot 402 need to be used, the cover plate 1 can be slid away from the second trough 201 by the cooperation of the slide rails 103 and the second sliders 205 to expose the USB interface slots. After use, the cover plate 1 can be slid into the second trough 201 by the cooperation of the slide rails 103 and the second sliders 205, so that the cover plate 1 is retained in the second faceplate 2. This can prevent dust, metal particles, and other objects from entering the USB interface slots.

Third Embodiment

Figure 3A:
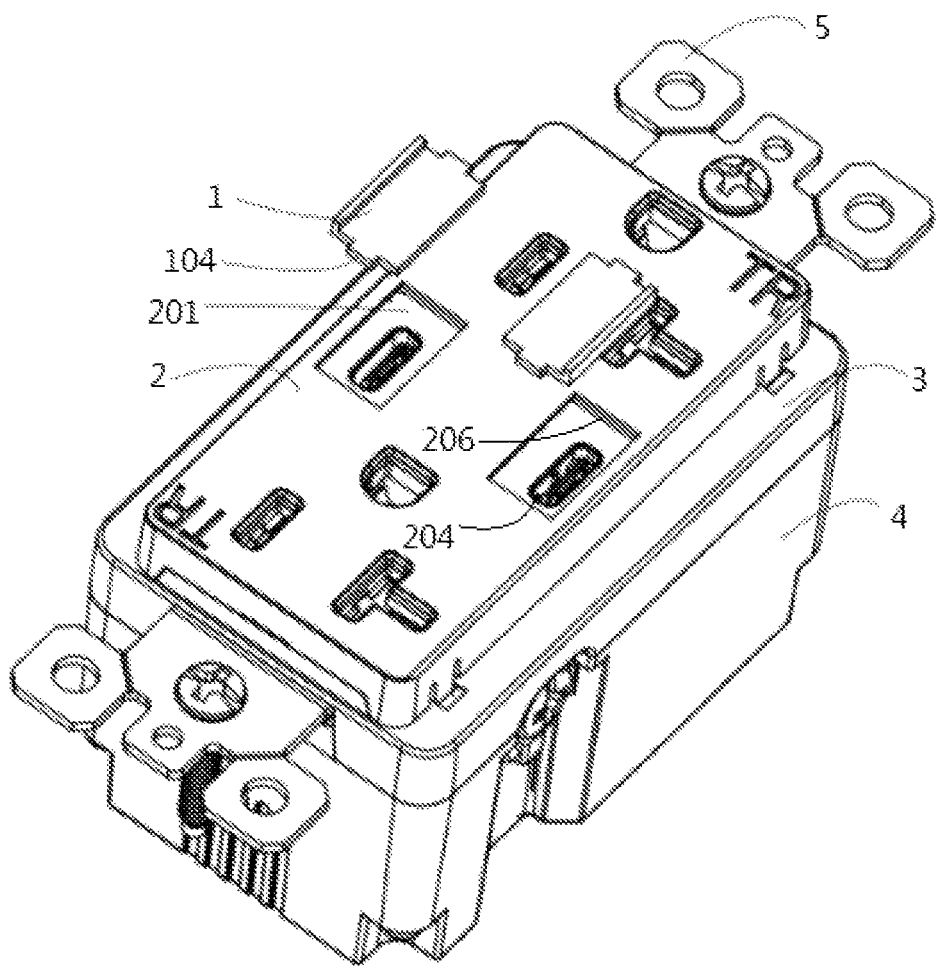
FIGS. 3a and 3b illustrate the structure of a power receptacle with protective covers according to a third embodiment of the present invention.
Figure 3B:
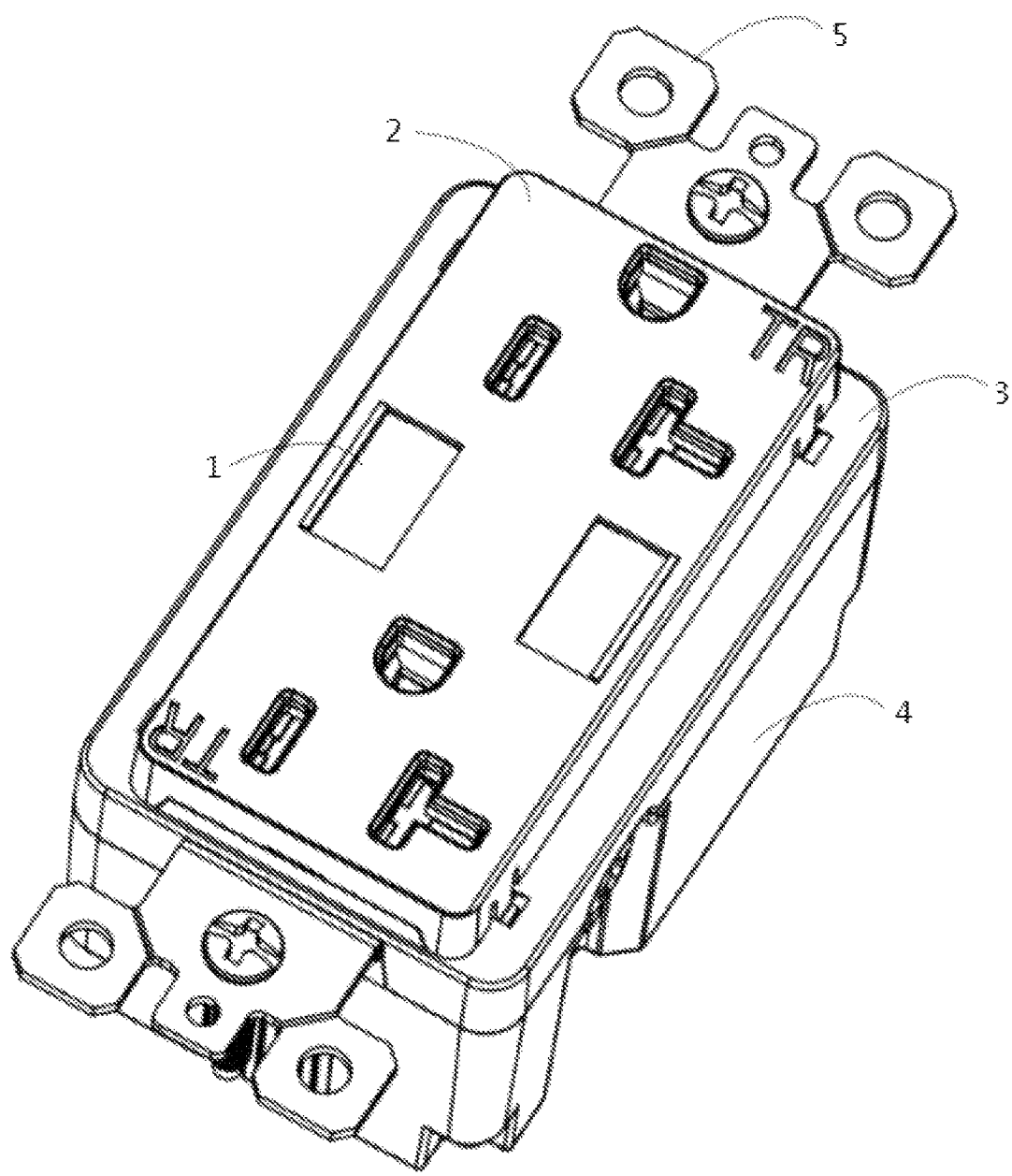

As shown in FIGS. 3a-3b, the power receptacle according to a third embodiment of the present invention includes a base assembly 4, a grounding assembly 5 coupled to the base assembly 4, a first faceplate 3 and a second faceplate 2 with multiple cover assemblies. In this embodiment, the base assembly 4, grounding assembly 5, first faceplate 3, and second faceplate 2 are similar to the corresponding components of the first and second embodiments, and their detailed descriptions are omitted. In the third embodiment, each cover assembly is configured to removably cover one of the USB Type-A or USB Type-C interface slots.

As shown in FIGS. 3a-3b, each cover assembly includes a cover plate 1 and a sliding block 104. The cover plate 1 is configured to cover one of the USB Type-A interface slot 401 and USB Type-C interface slot 402. The sliding block 104 is located on one side of the cover plate 1, so that the cover plate 1 is slidably coupled to the second faceplate 2 via the sliding block 104.

In this embodiment, the first faceplate 3 includes multiple first troughs (not shown in the drawings) and multiple first slide rails (not shown in the drawings). Each first trough has one first opening (not shown in the drawings) that corresponds to the USB interface slots 401 or 402, and the first slide rail is located on one side of the corresponding first trough. The shape of each first trough matches and complements the shape of each corresponding cover plate 1, so that when the cover plate 1 covers the USB interface slot, the corresponding first trough is coupled to the cover plate 1 via the cooperation of the sliding block 104 and the first slide rail.

Although the first troughs, the first slide rails and the first opening are not shown in the drawings, their structures are respectively similar to the second troughs, the second slide rails and the second or third opening of the second faceplate 2 described below. When the second faceplate 2 is not provided, the cover plates 1 are directly coupled to the first troughs of the first faceplate 3, similar to the way the cover plates 1 are coupled to the second troughs as described below.

In this embodiment, the second faceplate 2 includes multiple second troughs 201 and multiple second slide rails 206 each located on one side of a corresponding second trough 201. One second opening 203 that corresponds to the USB Type-A interface slot 401 or one third opening 204 that correspond to the USB Type-C interface slot 402 is provided within each second trough 201.

In this embodiment, the shape of each second trough 201 matches and complements the shape of each corresponding cover plate 1, so that when the cover plate 1 covers the USB Type-A interface slot 401 or the USB Type-C interface slot 402, the second trough 201 is coupled to the cover plate 1 via the cooperation of the sliding block 104 and the slide rail 206. More specifically, the cover plates 1 may be inserted into the second troughs 201 from the underside of the second faceplate 2 before the second faceplate 2 is assembled with the first faceplate 3, and can slide along the slide rail 206 under the top surface of the second faceplate 2.

Compared to the first and second embodiment, in the third embodiment, the receptacle has multiple cover assemblies, each configured to cover only one USB interface slot. Therefore, the multiple cover assemblies can be flexibly used to cover one or more USB interface slots.

The power receptacle with protective cover according to embodiments of the present invention can prevent dust, metal particles, and other objects from entering the slots of the receptacle. This can prolong the life of the receptacle and ensure safety of the receptacle by preventing short circuit conditions caused by metal particles or other objects falling into the slots.

While the present invention is described above using specific examples, these examples are only illustrative and do not limit the scope of the invention. It will be apparent to those skilled in the art that various modifications, additions and deletions can be made to the power receptacle of the present invention without departing from the spirit or scope of the invention.

What is claimed is:

1. A power receptacle with protective functions, comprising:
   a base assembly;
   a grounding assembly coupled to the base assembly;
   a faceplate coupled to a top of the base assembly, including at least one USB (Universal Serial Bus) interface slot electrically coupled to the base assembly;
   a cover assembly, removably coupled to the faceplate and configured to cover the USB interface slot;
   wherein the cover assembly includes:
   a cover plate, configured to cover the at least one USB interface slot;
   one or more rotation shafts, disposed on a first side of the cover plate, and configured to pivotally couple the cover plate to the faceplate; and
   a snap, disposed on a second side of the cover plate different from the first side, and configured to retain the cover plate to the faceplate by cooperating with the faceplate;
   wherein the faceplate includes:
   a trough, including an opening that corresponds to the USB interface slot; and
   a locking member located on one side of the trough;
   wherein a shape of the trough matches and complements a shape of the cover plate, wherein another side of the trough is configured to receive the rotation shafts, and wherein when the cover plate covers the at least one USB interface slot, the snap and the locking member cooperate with each other to lock the cover plate to the faceplate.

2. A power receptacle with protective functions, comprising:
   a base assembly;
   a grounding assembly coupled to the base assembly;
   a first faceplate coupled to a top of the base assembly, including at least one USB (Universal Serial Bus) interface slot electrically coupled to the base assembly, wherein the at least one USB interface slot includes one or more of at least one USB Type-A interface slot and at least one USB Type-C interface slot;
   a second faceplate removably coupled to the top of the first faceplate;
   a cover assembly removably coupled to the second faceplate and configured to cover the USB interface slot;
   wherein the cover assembly includes:
   a cover plate, configured to cover the at least one USB interface slot;
   one or more rotation shafts, disposed on a first side of the cover plate, and configured to pivotally couple the cover plate to the second faceplate; and
   a snap, disposed on a second side of the cover plate different from the first side, and configured to retain the cover plate to the second faceplate by cooperating with the second faceplate;
   wherein the second faceplate includes:
   a trough, including an opening that corresponds to the USB Type-A interface slot and/or an opening that corresponds to the USB Type-C interface slot; and
   a locking member located on one side of the trough;
   wherein a shape of the trough matches and complements a shape of the cover plate, wherein another side of the trough is configured to receive the rotation shafts, and wherein when the cover plate covers the at least one USB interface slot, the snap and the locking member cooperate with each other to lock the cover plate to the second faceplate.

3. A power receptacle with protective functions, comprising:
   a base assembly;
   a grounding assembly coupled to the base assembly;
   a faceplate coupled to a top of the base assembly, including at least one USB (Universal Serial Bus) interface slot electrically coupled to the base assembly;
   a cover assembly, removably coupled to the faceplate and configured to cover the USB interface slot;
   wherein the cover assembly includes:
   a cover plate, configured to cover the at least one USB interface slot; and
   two slide rails, respectively located on two sides of the cover plate;
   wherein the cover plate is slidably coupled to the faceplate via the slide rails;
   wherein the faceplate further includes:
   a trough, including an opening that corresponds to the at least one USB interface slot; and
   two sliders located on two sides of the trough;
   wherein a shape of the trough matches and complements a shape of the cover plate, wherein when the cover plate covers the at least one USB interface slot, the trough is coupled to the cover plate via cooperation of the two slide rails and two sliders.

4. A power receptacle with protective functions, comprising:
   a base assembly;
   a grounding assembly coupled to the base assembly;
   a first faceplate coupled to a top of the base assembly, including at least one USB (Universal Serial Bus) interface slot electrically coupled to the base assembly, wherein the at least one USB interface slot includes one or more of at least one USB Type-A interface slot and at least one USB Type-C interface slot;
   a second faceplate removably coupled to the top of the first faceplate;
   a cover assembly removably coupled to the second faceplate and configured to cover the USB interface slot;
   wherein the cover assembly includes:
   a cover plate, configured to cover the at least one USB interface slot; and
   two slide rails, respectively located on two sides of the cover plate;
   wherein the cover plate is slidably coupled to the second faceplate via the slide rails;
   wherein the second faceplate further includes:
   a trough, including an opening that corresponds to the USB Type-C interface slot and/or an opening that corresponds to the USB Type-C interface slot; and
   two sliders located on two sides of the trough;
   wherein a shape of the trough matches and complements a shape of the cover plate, wherein when the cover plate covers the at least one USB interface slot, the trough is coupled to the cover plate via cooperation of the two slide rails and two sliders.

5. A power receptacle with protective functions, comprising:
   a base assembly;
   a grounding assembly coupled to the base assembly;

a faceplate coupled to a top of the base assembly, including at least one USB (Universal Serial Bus) interface slot electrically coupled to the base assembly;

a plurality of cover assemblies, wherein each cover assembly is removably coupled to the faceplate and includes a cover plate configured to removably cover the at least one USB interface slot;

wherein the faceplate further includes:

a plurality of troughs, each trough including an opening that corresponds to one of the USB interface slots; and a plurality of slide rails, each slide rail located on one side of a corresponding trough;

wherein a shape of the each of the plurality of troughs matches and complements a shape of a corresponding one of the plurality of cover plates, and wherein when the cover plate covers the USB interface slot, the trough is coupled to the cover plate via cooperation of the corresponding sliding block and the slide rail.

6. The power receptacle of claim 5, wherein each cover assembly further includes:

a sliding block, located on one side of the cover plate;

wherein the cover plate is slidably coupled to the faceplate via the sliding block.

7. A power receptacle with protective functions, comprising:

a base assembly;

a grounding assembly coupled to the base assembly;

a first faceplate coupled to a top of the base assembly, including at least one USB (Universal Serial Bus) interface slot electrically coupled to the base assembly, wherein the at least one USB interface slot includes one or more of at least one USB Type-A interface slot and at least one USB Type-C interface slot;

a second faceplate removably coupled to the top of the first faceplate;

a plurality of cover assemblies, wherein each cover assembly is removably coupled to the second faceplate and includes a cover plate configured to cover the USB interface slot;

wherein the second faceplate further includes:

a plurality of troughs, each first trough including an opening that corresponds to one USB Type-A interface slot or an opening that corresponds to one USB Type-C interface slot; and a plurality of slide rails, each slide rail located on one side of a corresponding trough;

wherein a shape of the each of the plurality of troughs matches and complements a shape of a corresponding one of the plurality of cover plates, wherein when the cover plate covers the USB Type-A interface slot or the USB Type-C interface slot, the trough is coupled to the cover plate via cooperation of the corresponding sliding block and the slide rail.

8. The power receptacle of claim 7, wherein each cover assembly further includes:

a sliding block, located on one side of the cover plate;

wherein the cover plate is slidably coupled to the second faceplate via the sliding block.

* * * * *